May 26, 1953        P. HERTZBERG        2,639,438
JOINT OR COUPLING BETWEEN TANK BALL AND LIFT ROD
Filed Sept. 19, 1951
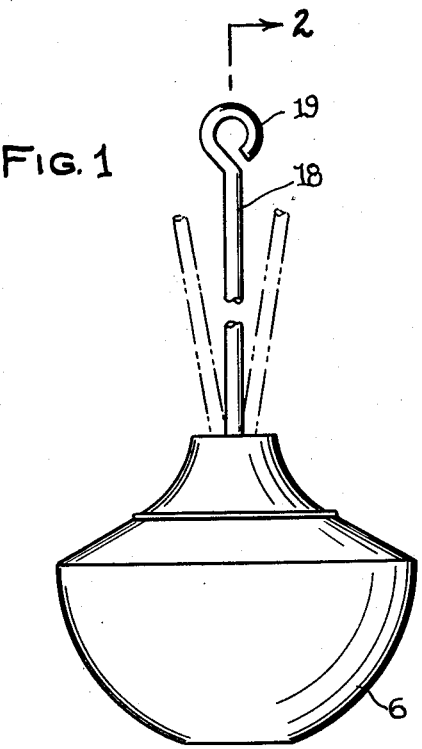
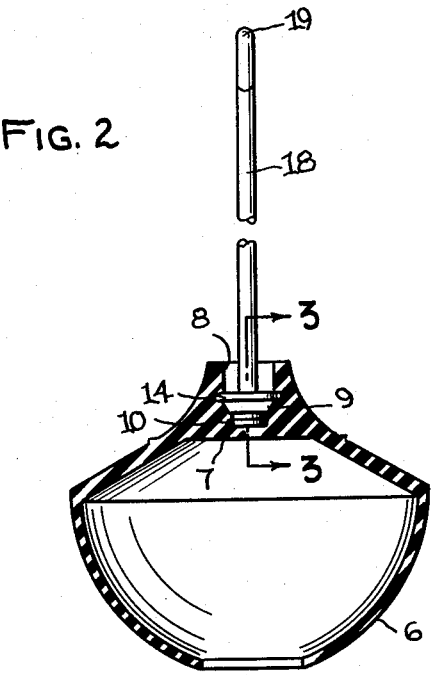
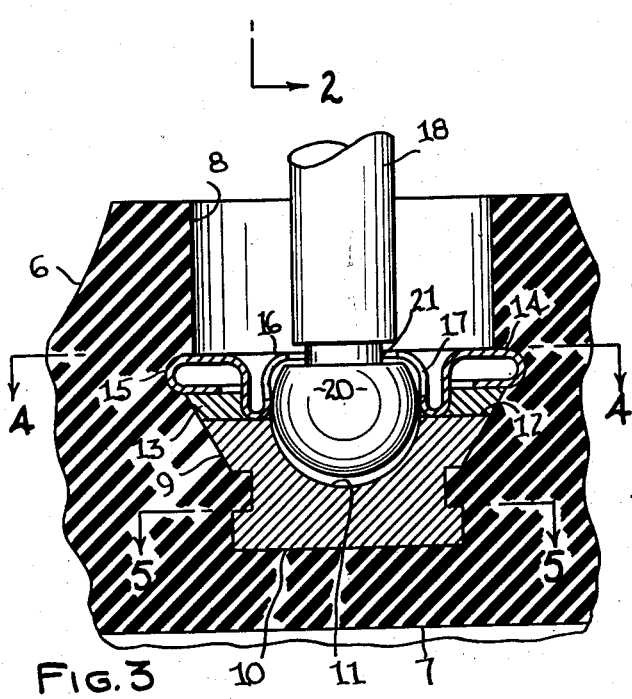
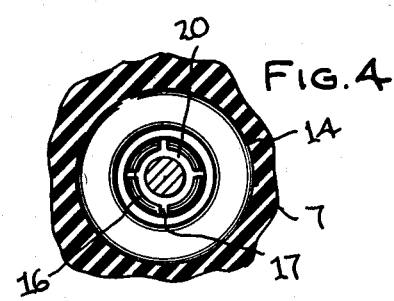
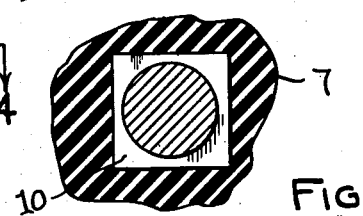
INVENTOR.
PHILIP HERTZBERG
BY
ATTORNEYS.

Patented May 26, 1953

2,639,438

UNITED STATES PATENT OFFICE 2,639,438

JOINT OR COUPLING BETWEEN TANK BALL AND LIFT ROD

Philip Hertzberg, Cleveland, Ohio

Application September 19, 1951, Serial No. 247,258

6 Claims. (Cl. 4—56)

1

This invention relates generally to tank balls for water closets, but has reference more particularly to a novel joint or connection between a tank ball and tank ball lift rod.

Lift rods for tank balls are usually removably connected to the tank ball by means of a threaded rigid connection which does not permit of any angular movement of the rod relatively to the axis of the tank ball.

Although the lift rod is usually guided in its vertical movements, it sometimes happens that the rod, for one reason or another, becomes bent or distorted, so that if the rod is rigidly connected to the ball, the ball does not seat properly. This results in annoying toilet noises and waste or loss of water.

The present invention has as its primary object the provision of a novel joint or coupling between a tank ball and a lift rod, whereby the lift rod has a limited angular movement in any direction relatively to the vertical axis of the tank ball, so as to permit the tank ball to seat properly, irrespective of any bending or distortion of the lift rod.

Another object of the invention is to provide a joint or coupling of the character described, which will permit connection of the rod to the ball and removal of the rod from the ball much more quickly than is possible with any joint or coupling heretofore employed between a tank ball and lift rod.

A further object of the invention is to provide a novel construction of tank ball for water closets.

A still further object of the invention is to provide a novel construction of lift rod for tank balls.

Other objects and advantages of my invention will be apparent during the course of the following description. In the accompanying drawings forming a part of this specification and in which like numerals are employed to designate like parts throughout the same, Fig. 1 is a side elevational view of a tank ball and lift rod embodying and novel features of the invention;

Fig. 2 is a vertical cross-sectional view, taken on the line 2—2 of Fig. 1;

Fig. 3 is a fragmentary vertical cross-sectional view, on an enlarged scale, taken on the line 3—3 of Fig. 2, and showing the novel coupling or joint between the tank ball and lift rod;

Fig. 4 is a fragmentary horizontal cross-sectional view, taken on the line 4—4 of Fig. 3, and Fig. 5 is a fragmentary horizontal cross-sectional view, taken on the line 5—5 of Fig. 3.

2

Referring more particularly to the drawings, reference numeral 6 designates a hollow rubber tank ball of somewhat conventional form, having an upper transverse solid portion 7, which communicates with a circular opening 8 in the upper end of the ball.

Embedded within the center of the portion 7 of the ball is a metallic member 9 having a rectangular or square base 10, so that the member 9, when incorporated in the ball at the time the ball is molded, will not rotate about its axis relatively to the ball. The member 9 is also provided with a hemspherical socket or seat 11, in the center of the upper face 12 thereof.

Secured to the upper face 12 of the member 9, as by solder 13, is a metallic snap fastener 14 of annular form, the marginal or peripheral portion 15 of which extends laterally into the material of the ball beyond the wall of the opening 8, so as to prevent vertical displacement of both the member 9 and snap fastener 14 from the ball.

The snap fastener 14 is provided with a radially-inwardly extending flange 16, of arcuate cross-section, which is provided at circumferentially-spaced points with radially-extending slits 17, the presence of which facilitates bending of the flange 16 outwardly when the lift rod is connected to the ball, as presently to be described.

The lift rod is generally designated by reference numeral 18, and is made from a length of wire or the like. It is provided at its upper end with an eyelet 19 and has formed at its lower end ball 20 of substantially the same diameter as the diameter of the socket or seat 11, being spaced from the rod 18 by an annular groove or recess 21 of a diameter slightly smaller than the diameter of the rod 18. In practice, the ball 20 will be formed integrally with the rod 18.

In connecting the lift rod to the ball, the ball 20 is pushed through the opening formed by the flange 16, the flange being spread laterally by the ball, this spreading being facilitated by virtue of the provision of the slits 17 in the flange. After the ball has passed the upper end of the flange 16, the resilience of the flange restores it to its original condition, as shown in Figs. 3 and 4, in which condition, it extends partially into the recess 21.

The connection which is thus provided between the ball 20 and elements 11 and 16 is virtually a ball and socket joint, which permits a limited angular movement of the lift rod in any direction relatively to the vertical axis of the tank ball, as clearly shown in Fig. 1. This permits the tank ball to seat properly at all times, irrespective of any bending or distortion of the lift rod. This angular movement is permitted, due to the clearance between the flange 16 and the lift rod, which is clearly shown in Fig. 3.

The coupling or connection permits the lift rod to be quickly and easily removed by a direct pull on the lift rod relatively to the ball, which pull withdraws the ball 20 from the socket 11 and through the opening formed by the flange 16. The pull required for this purpose must necessarily be greater than that required to normally lift the tank ball by means of the lift rod.

It is thus seen that I have provided a novel joint or coupling between a tank ball and a lift rod, which overcomes all of the disadvantages to which reference has been made.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In combination, a tank ball having a metallic member embedded in the upper central portion thereof, said member having a lower portion of non-circular external cross-section, whereby to resist rotation of said member relatively to said ball, said member having a hemispherical socket in the upper end thereof forming a bearing surface, a snap fastener disposed above said member and rigidly secured to the upper end of said member, the material of said tank ball extending over a portion of said snap fastener, whereby to resist vertical displacement of said member and fastener from the tank ball, and a lift rod having a ball portion at the lower end thereof disposed in said socket and removably retained in said socket by said snap fastener.

2. The combination, as defined in claim 1, in which said snap fastener has a radially-inwardly extending flange of arcuate vertical cross-section, said flange having a plurality of circumferentially-spaced, radially-extending, slits.

3. The combination, as defined in claim 2, in which said flange defines an opening for reception of said lift rod ball portion, said opening being of lesser diameter than the diameter of said ball portion of the rod.

4. The combination, as defined in claim 3, in which said snap fastener is soldered to the upper end of said member.

5. The combination, as defined in claim 4, in which a portion of the material of the tank ball extends radially inwardly into said member between the upper and lower ends of the member, whereby to assist in preventing vertical displacement of said member from the ball.

6. The combination, as defined in claim 5, in which the material of the tank ball which extends over a portion of the snap fastener defines a cylindrical opening through which the lift rod extends.

PHILIP HERTZBERG.

References Cited in the file of this patent

UNITED STATES PATENTS

| Number | Name | Date |
|---|---|---|
| 1,593,548 | Delany | July 20, 1926 |
| 1,924,381 | Sachs | Aug. 29, 1933 |
| 2,001,390 | Lester | May 14, 1935 |
| 2,035,626 | Walker | Mar. 31, 1936 |
| 2,208,779 | Tinnerman | July 23, 1940 |
| 2,336,153 | Ryder | Dec. 7, 1943 |
| 2,475,681 | Stentz | July 12, 1949 |